US006219698B1

(12) United States Patent
Iannucci et al.

(10) Patent No.: US 6,219,698 B1
(45) Date of Patent: *Apr. 17, 2001

(54) CONFIGURING CLIENT SOFTWARE USING REMOTE NOTIFICATION

(75) Inventors: Robert A. Iannucci, Lexington; Christopher M. Weikart, Cambridge, both of MA (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,365

(22) Filed: Dec. 19, 1997

(51) Int. Cl.[7] .................................................. G06F 9/445
(52) U.S. Cl. ................................. 709/221; 709/203
(58) Field of Search .......................... 707/10, 2; 379/27; 370/338; 395/700, 500, 800.43, 873; 709/208, 216, 221, 203; 607/59; 348/416

(56) References Cited

U.S. PATENT DOCUMENTS

| 5,241,671 | | 8/1993 | Reed et al. ............................ 395/600 |
| 5,421,017 | * | 5/1995 | Scholz et al. ......................... 395/700 |
| 5,434,678 | | 7/1995 | Abecassis ............................. 358/342 |
| 5,452,339 | * | 9/1995 | Siu et al. ................................ 379/27 |
| 5,583,576 | | 12/1996 | Perlman et al. ..................... 348/460 |
| 5,588,143 | * | 12/1996 | Stupek, Jr. et al. ................. 395/500 |
| 5,666,293 | * | 9/1997 | Metz et al. ........................... 709/208 |
| 5,828,897 | * | 10/1998 | Kirsch et al. ........................... 712/43 |
| 5,835,712 | * | 11/1998 | DuFresne .............................. 709/203 |
| 5,848,064 | * | 12/1998 | Cowan ................................... 370/338 |
| 5,875,443 | * | 2/1999 | Nielsen ..................................... 707/2 |
| 5,909,581 | * | 6/1999 | Park ....................................... 395/712 |
| 5,974,454 | * | 10/1999 | Apfel et al. ........................... 709/221 |
| 5,999,740 | * | 12/1999 | Rowley ................................. 395/712 |
| 6,009,274 | * | 12/1999 | Fletcher et al. ...................... 395/712 |
| 6,038,586 | * | 3/2000 | Frye ...................................... 709/100 |

FOREIGN PATENT DOCUMENTS

| 0 691 651 A1 | 1/1996 | (EP) . |
| 0 810 603 A1 | 3/1997 | (EP) . |
| 0 795 873 A2 | 9/1997 | (EP) . |
| 0 817 181 A2 | 1/1998 | (EP) . |
| WO 97/05616 | 2/1997 | (WO) . |
| WO 97/06531 | 2/1997 | (WO) . |
| WO 97/08699 | 3/1997 | (WO) . |
| WO 98/09290 | 3/1998 | (WO) . |

* cited by examiner

Primary Examiner—Robert B. Harrell
Assistant Examiner—Thong Vu
(74) Attorney, Agent, or Firm—Hamilton, Brook, Smith & Reynolds, P.C.

(57) ABSTRACT

To maintain communications between first and second processing systems interconnected by a communications network, computer programing having first and second sets of instructions are stored at the first processing system. The computer programing is initialized at the first processing system to perform a task associated with the first set of instructions. In accordance with the second set of instructions, a first signal is automatically transmitted from the first processing system to the second processing system responsive to the initialization of the computer programming.

53 Claims, 4 Drawing Sheets

CONFIGURING CLIENT SOFTWARE USING REMOTE NOTIFICATION

FIELD OF THE INVENTION

The present invention relates in general to information distribution. More particularly, the present invention relates to information distribution using remote notification and is especially suitable for distributing new software upgrades via a network, such as the Internet.

BACKGROUND OF THE INVENTION

Software applications operating on a user's computing device become outdated as new versions of the software are developed. Software distributors face the challenge of notifying existing users that an upgrade to a software application is available and convincing the users to obtain and install the upgrade.

First, software application users typically have little motivation to initiate contact with software distributors to obtain upgrades. Further, software distributors often lose contact with users of software applications which have been previously distributed. This loss of contact prevents distributors from easily offering upgrades, as well as new products, to users of previously distributed software applications who may have an interest in the new product offerings. Further, even if they are notified of an upgrade or other product, users face the inconvenience of having to obtain and load the upgrade or new software product. Recently, many software applications have become available through electronic distribution, particularly over the Internet. In the typical case of software distributed over the Internet, the distributor maintains the software applications on a server at the distributor's web site. Information relating to the ordering and downloading of the software applications from the web site is available on the distributor's Internet web site, e.g. their download page.

A potential user can access the distributor's web site via the Internet using, for example, a personal computer or other computing device at the potential user's home, office or other site. The distributor's web page is customarily downloaded to the potential user's computing device and can be manipulated by the potential user to order one or more desired software applications. These applications are then automatically downloaded off the distributor's web server to the user's site and installed on the user's computing device.

Although the Internet has, in some ways, made the ordering and distribution of software applications more efficient, it has not made it easier for distributors to maintain contact with current users of software applications or to notify and convince such users to order and install upgrades or to consider the purchase of new product offerings. In fact, because the point of distribution has become a web site rather than a store front, it has, to some extent, become even more difficult to maintain contact with current users. Distributors can attempt to maintain contact with current users by using communication channels such as the telephone, postal mail and Internet E-mail. However, these channels of communications tend to be expensive, inefficient and/or poorly targeted.

Thus, a need remains for way in which to inexpensively, efficiently and in a well targeted manner (i) maintain contact with existing users of software applications, (ii) notify existing users of software applications of the availability of software upgrades and new product offerings, and (iii) make it convenient for existing users of software applications to obtain and install software upgrades and new products.

OBJECTIVES OF THE INVENTION

It is, accordingly, an object of the present invention to provide a technique for maintaining contact with existing users of software applications.

It is another object of the present invention to provide a technique for notifying existing users of software applications of the availability of software upgrades.

It is a further object of the present invention to provide a technique for offering new products or conveying new information in a well targeted manner.

It is a further object of the present invention to provide a technique for facilitating the convenient obtention and installation of software upgrades and new products.

It is an additional object of the present invention to perform the above objects inexpensively and efficiently.

Additional objects, advantages, and novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In accordance with the invention, communications between multiple processing systems, such as clients and servers interconnected by a network, are maintained by storing a software application having first and second sets of instructions at one or more of the processing systems. The instructions can be stored on any suitable memory device. The first set of instructions include programming capable of directing the applicable system processor to perform a desired task.

Responsive to the programing being initialized by the processor of a first processing system to perform the desired task, the processor, in accordance with the second set of instructions, generates a first signal representing information, such as an identification of the current version of the first set of instructions stored at the first processing system. Initialization of the programming may, for example, occur when the programming is first loaded from the applicable memory device, or at some other point in the operation of the first processing system relating to performance of the desired task.

The first signal is transmitted to a second of the processing systems, e.g. a network server from which the programming was initially downloaded. The transmission of the information represented by the first signal links the first and second processing systems. The second processing system can now communicate with the first processing system for the purposes of upgrading the first set of instructions, offering new products and/or providing other information.

It will be recognized that the processing systems may, for example, be personal or network computers, workstations, mini-computers, main frame computers and/or other networked devices as well as any combination thereof. The first set of instructions, could be an application program previously distributed via the network, e.g. downloaded to the first processing system by the second processing system, although this is not necessarily the case. The network can be a local area network (LAN) or wide area network (WAN) or any other type of network, including the Internet.

According to other aspects of the invention, responsive to the first signal, the second processing system automatically transmits a second signal to the first processing system. The second signal is indicative of the information available on the second processing system or another of the processing systems. The second signal may include the information itself, which can be of virtually any type. In a preferred implementation, the second signal includes information associated with an upgrade of the first set of instructions, such as a textual description of features of a new version of these instruments, and/or an indicator, such as an icon type symbol, indicating that some other type of information is available, e.g. information regarding a new product etc.

A display, which can be of any type, is typically provided at the first processing system to facilitate the display of the new upgrade description and the indicator of the availability of other types of information. The description of the upgrade to the first set of instructions represented by the second signal is preferably displayed periodically, at intervals which may be selectable with an input device of the first processing system. The indicator, which may for example be a button icon, is preferably displayed continuously until being activated, for example by clicking on a button icon using a mouse as the input device, to request the available information represented by the indicator. Responsive to the button being pressed, the indicator is removed from the display. The removal of the indicator from the display could of course occur at any point after the input command is entered, for example when the available information is received, processed or stored at the first processing system. Preferably, the first processing system includes a memory which stores first and second values, one of which is changed responsive to the second signal. For example, one value may be changed when the second signal is received or processed by the applicable processing system so that the values are unequal to thereby cause the indicator to be illuminated on the display if information other than upgrade information is available.

In certain implementations, it may be preferable for the second processing system to determine, responsive to the first signal, if the first processing system is within a defined group. For example, the group may be within a particular business or industry, within a particular geographic region, or within some other desired grouping. In such cases, the second signal is transmitted to the first processing system only if it is determined to be within the defined group.

As discussed above, an input device, such as a mouse, will allow a command to be input at the first processing system to request information available from the second or some other processing system. Responsive to the input command, a third signal is generated by the first system processor and transmitted, in accordance with the second set of instructions, to the second or other processing system, thereby forwarding the request for the available information. Preferably, one of the previously described first and second values is again changed, e.g. such that the values are equal, responsive to the input command to cause the indicator to be removed from the display.

Responsive to the third signal, the second processing system transmits a fourth signal representing the available information itself or a link to the available information, to the first processing system for processing. Beneficially, at least certain types of represented information are displayed at the first processing system display.

In accordance with still other aspects of the invention, the first processing system has a network browser, such as an Internet web browser, stored on its memory. Using the network browser, the system processor can operate to locate web pages over the network. A located web page can then be displayed on the first processing system display. Preferably, the information represented by the second signal, e.g. information associated with an upgrade and/or an indicator of other types of information, is displayed within the web page. Beneficially, the other types of information represented by the fourth signal, i.e. information other than that associated with an upgrade of the first set of instructions, which has been forwarded to the first processing system from another network processing system is loaded into the network browser.

BRIEF DESCRIPTION OF THE DRAWINGS

For a more complete understanding of the present invention, reference is made to the following detailed description taken in conjunction with the accompanying drawings wherein.

PREFERRED EMBODIMENT OF THE INVENTION

Figure 1:
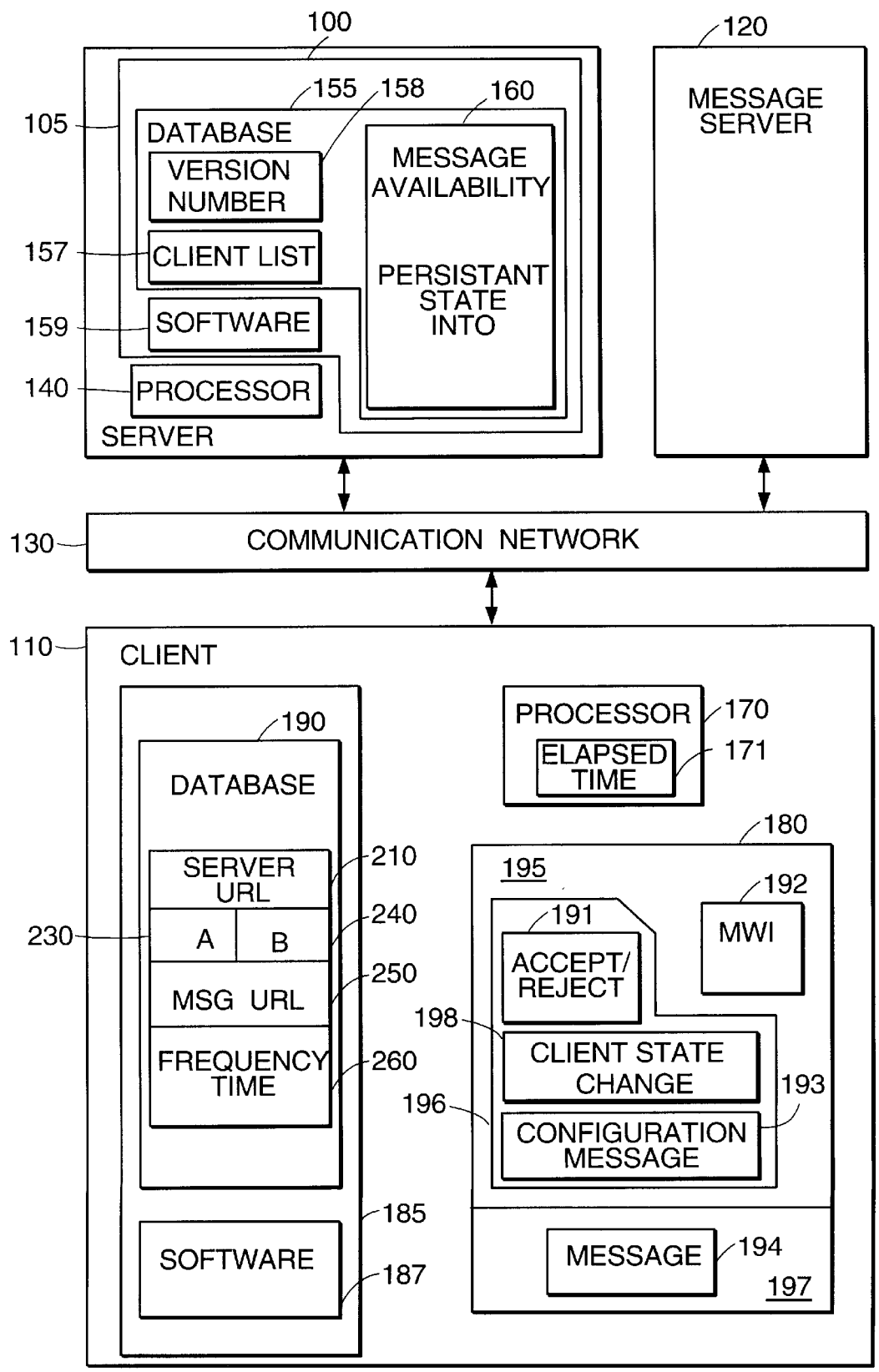
FIG. 1 is a block diagram of a system for sending and receiving automatic message notification in accordance with the present invention.

Referring now to FIG. 1, there is illustrated a functional block diagram of a system f or sending and receiving automatic message notification and remote client configuration. A server 100, a client 110 and at least one message server 120 communicate with each other via a communication network 130. Although the communication network 130 can be of any type, the network 130 is the Internet in the preferred embodiment.

The server 100 includes a processor 140 and a memory 105. The memory 105 stores a software application 159 and a database 155. The database 155 has a current version number 158 of a particular software application, which will be called application A and which may be stored as part of the programming 159, a list of clients 157, and information 160 relating to the availability of a message including persistent state information.

The client 110 includes a processor 170 having an elapsed time counter 171, a display 180 and a memory 185. The memory 185 stores a database 190 and software 187, including the version of software application A which presently operates on the processor 170. The client 110 communicates with the server 100 via the communications network 130 and is capable of directing the display of a web pages 195 and 197 on the display 180. An accept/reject button 191, a message waiting indicator 192, and a configuration or upgrade message 193 and client state change directives 198 are shown displayed within the web page 195 on the display 180. The button 191, configuration message 193, and the directives 198 are all part of the configuration information 196 which appears within web page 195. The message 196 appears in a separate web page 197.

The database 190 contains server Universal Resource Locators (URL's) including the URL 210 associated with the server 100, a first persistent state value A 230 and a second persistent state value B 240, message URL's including the URL 250 associated with the message server 120 and a frequency time 260. If available, the frequency time is a user selected minimum time period between upgrade availability notifications.

Figure 2:
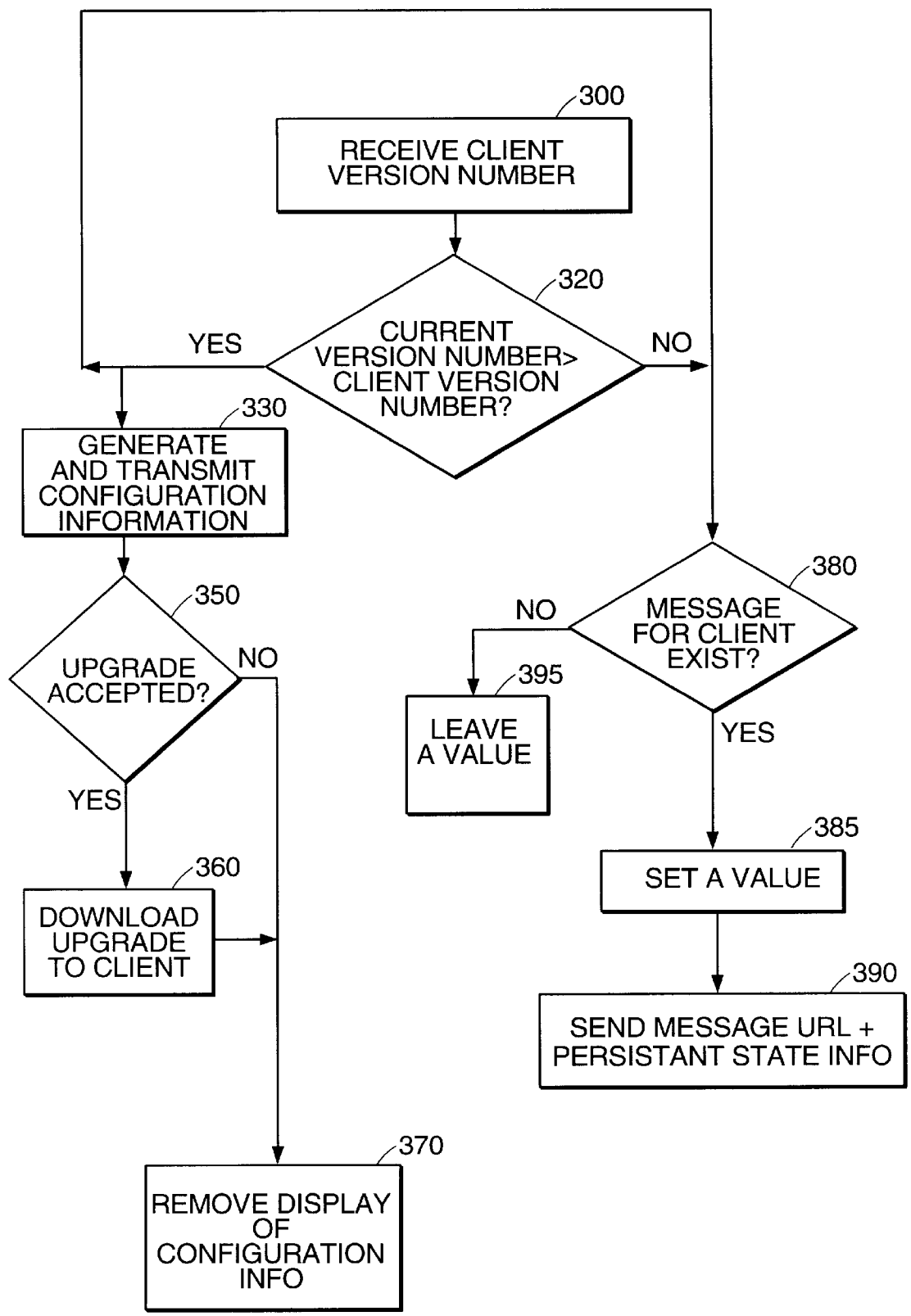
FIG. 2 is a flow diagram depicting certain steps performed in automatic message notification in accordance with the present invention.

Referring additionally now to FIG. 2, in response to a client processor 170 initializing the application A software stored on memory 185, the server 100, via the communication network 130, automatically receives a signal in step 300 which represents status information from the client 110, in accordance with programmed instructions included in the software 187 stored on the client memory 185. Among other information, the status information includes a client version number of the software application A stored on memory 185. Software application A may have been originally downloaded to the client 110 from server 100, or from a different network server. Alternatively, software application A could have been loaded directly to the client 110 from a floppy disk or other physical storage medium.

The server 100, in step 320, compares the client version number of software application A stored in client 110 against a current version number 158 of the software application A stored in the memory 155 of server 100 and determines whether the current version number 158 is greater than the client version number. If so, the server processor 140, in accordance with programmed instructions which form part of the software 159 stored on server memory 105, generates configuration information 196 in step 330. The configuration information 196 includes a configuration message 193 which contains information pertaining to features of the available upgrade of the software application A to current version number 158, and an offer to download the software application A upgrade. The configuration information 196 also includes, an accept/reject button 191. The configuration information 196 may further include client persistent state change directives 198. The server processor 140, in accordance with its programmed instructions, also directs the transmission of the configuration information 196 via the network 130 to the client 110 in step 330. The server processor 140, in step 350, additionally determines whether the offer is accepted or rejected through the receipt of a new request from client 110 to download the upgrade. If the offer is accepted the server 100 first downloads a web page containing a link to the software upgrade. Responsive to the user clicking on the link, the server 100 downloads the new version of the software to client 110 in step 360.

Figure 3:
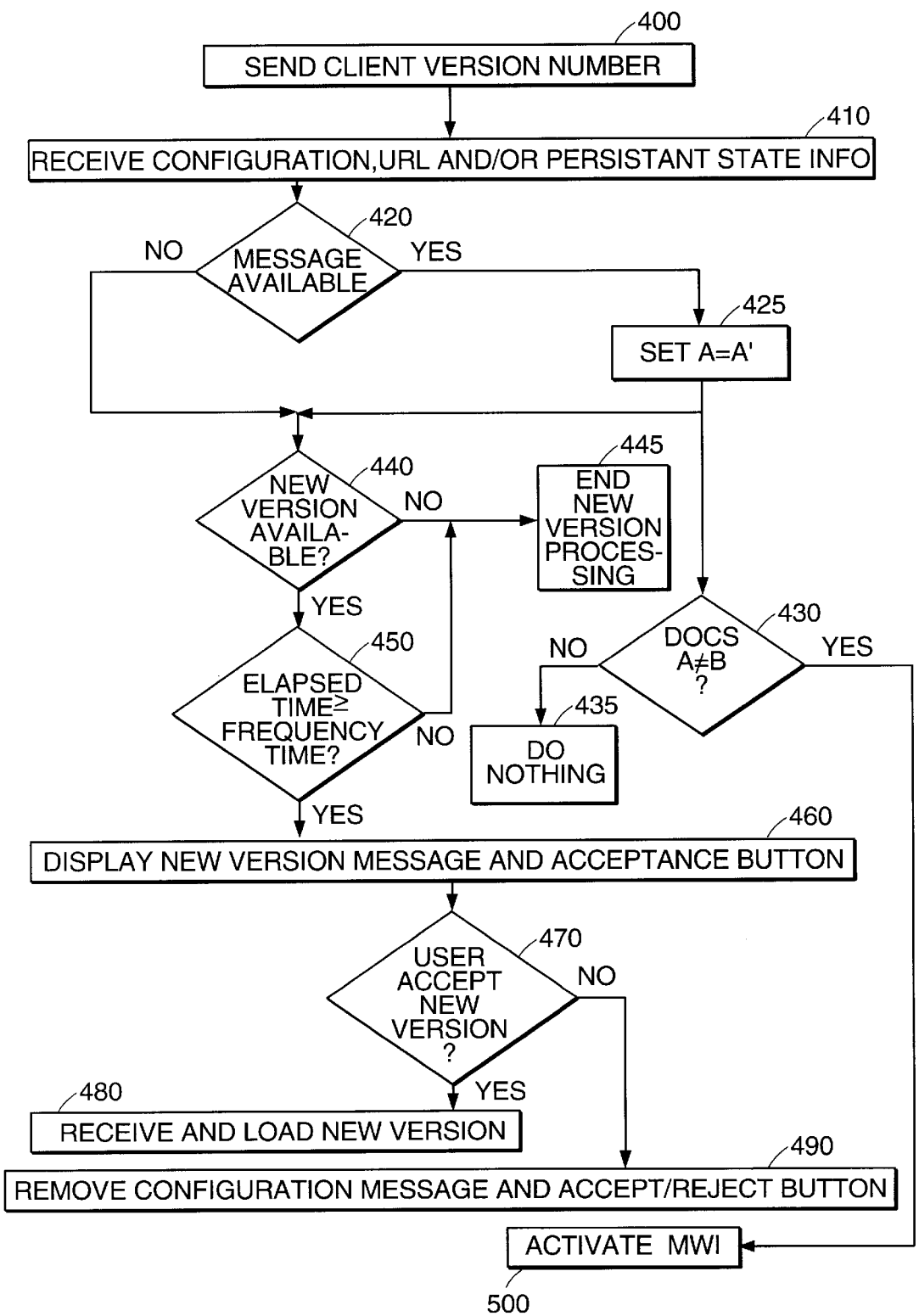
FIG. 3 is a flow diagram depicting certain other steps performed in automatic message notification in accordance with the present invention.

The configuration information 196, including the configuration message 193 and the accept/reject button 191 are displayed on the client display 180 in step 460 of FIG. 3. By clicking on the displayed accept/reject button 191 to accept the upgrade of software application A, a signal is generated and communicated from the client processor 170 to the server processor 140 via the network 130, responsive to which the server processor 140, in step 360, directs the downloading of the web page containing the link to the upgrade to the client 110. If accepted, the upgrade is downloaded and stored by processor 170 on client memory 185. By clicking on the accept/reject button 191 to accept or reject the upgrade, the configuration information 196 will be eliminated from the display 180 as indicated in step 370. Until the button 191 is clicked on, the configuration information 196 will continue to be displayed during the current session and will be redisplayed during each future session, subject to the selected minimum time periods between upgrade notification. If the upgrade is accepted or rejected, the previously displayed configuration information 196 will not be displayed during future sessions.

The server 100 also compares the client 110 against a database 155 containing a list of clients 157 and associated information 160 to determine whether a message for the client 110 exists as indicated by step 380. The information 160 indicates whether the message exists. For example, if the client 110 exists in the list of clients 157 and in the associated information 160, a URL for the message server 120 where the message is stored, which is also included in the information 160, is retrieved by server processor 140. The message can be a general message which is sent to all clients or the message can be specific to an individual or group of clients.

More particularly, if the server processor 140 determines that a message exists for the client 110, the server processor 140 sets persistent state information for A 230 equal to a value in step 385 and sends the value to the client 110 in step 390. Otherwise, in step 395, the server processor 140 does not set a persistent state information value, i.e. does nothing so that the value of A 230 remains the same. If a message exists for the client 110, the server processor 140 further sends the URL of the message server 120 where the message is stored to the client processor 170 as indicated in step 390.

Referring additionally now the FIG. 3, upon initializing software application A at the client 110, for example by loading software application A from the client memory 185 for execution by client processor 170, the client processor 170 generates and sends a signal representing the status information to the server 100 in step 400. In response to this information, the client 110 receives from server 100 configuration and/or other information in step 410. The configuration information indicates the availability of an upgrade to software application A while the other information includes persistent state information 196 indicating whether a message is available and, if so, where it is stored. If a new upgrade of the software application is available, the configuration information 196 includes a configuration message 193, which contains information pertaining to the new version of the software application and an offer to download the new version of the software, and the accept/reject button 191. If a message is available, the other information includes a persistent state information value for A 230 and a URL of the message server 120 where the message for the client 110 is stored.

As previously described, if a message 194 is available for the client 110, the received persistent state information value for A 230 will be set, otherwise, the persistent state information value of A 230 will remain unchanged. In step 420, the client processor 170 determines whether or not the server 100 has transmitted a directive for setting A 230 to a value A', i.e. determines if a message is available. If so, the processor 170, in step 425, sets persistent state value A 230, stored within the database 190, to the persistent state value A'. In step 430 the processor 170 determines if the value of A 230 now stored in database 190 is unequal to the value B 240 which is also stored within the database 190. If the A and B state values 230, 240 are unequal, the client processor 170 activates the MWI 192 in step 500. Otherwise, the client processor 170 does nothing in step 435 and the MWI 192 is not activated.

The client processor 170 also determines if configuration information 196 is received in step 440. If so, the client processor compares the value of the elapsed time counter 171 against the value of the frequency time 260 in step 450. Otherwise, the client processor ends the new version processing in step 445. The elapsed time counter 171 continually counts the passage of time since a configuration information 196 was last displayed or directed by client processor 170 to be displayed on display 180. That is only when the value of the elapsed time counter 171 indicates that the period since information 196 was last displayed is equal to or greater than the frequency time does the client processor 170 display the configuration information 196. The frequency time is set by the user during installation and specifies a minimum length of time between notifications.

Hence, if the elapsed time is equal to or greater than the frequency time 260 stored on the client memory, the client processor 170 directs the display of configuration information 196 in step 460. The client processor 110 monitors to see whether the user has accepted or rejected the offer in step 470. If the user accepts the offer, the client processor 170 requests and loads the new version of the software in step 480 as has been previously described. The client processor 170 also directs removal of the configuration information 196 from the display 180 in step 490.

Figure 4:
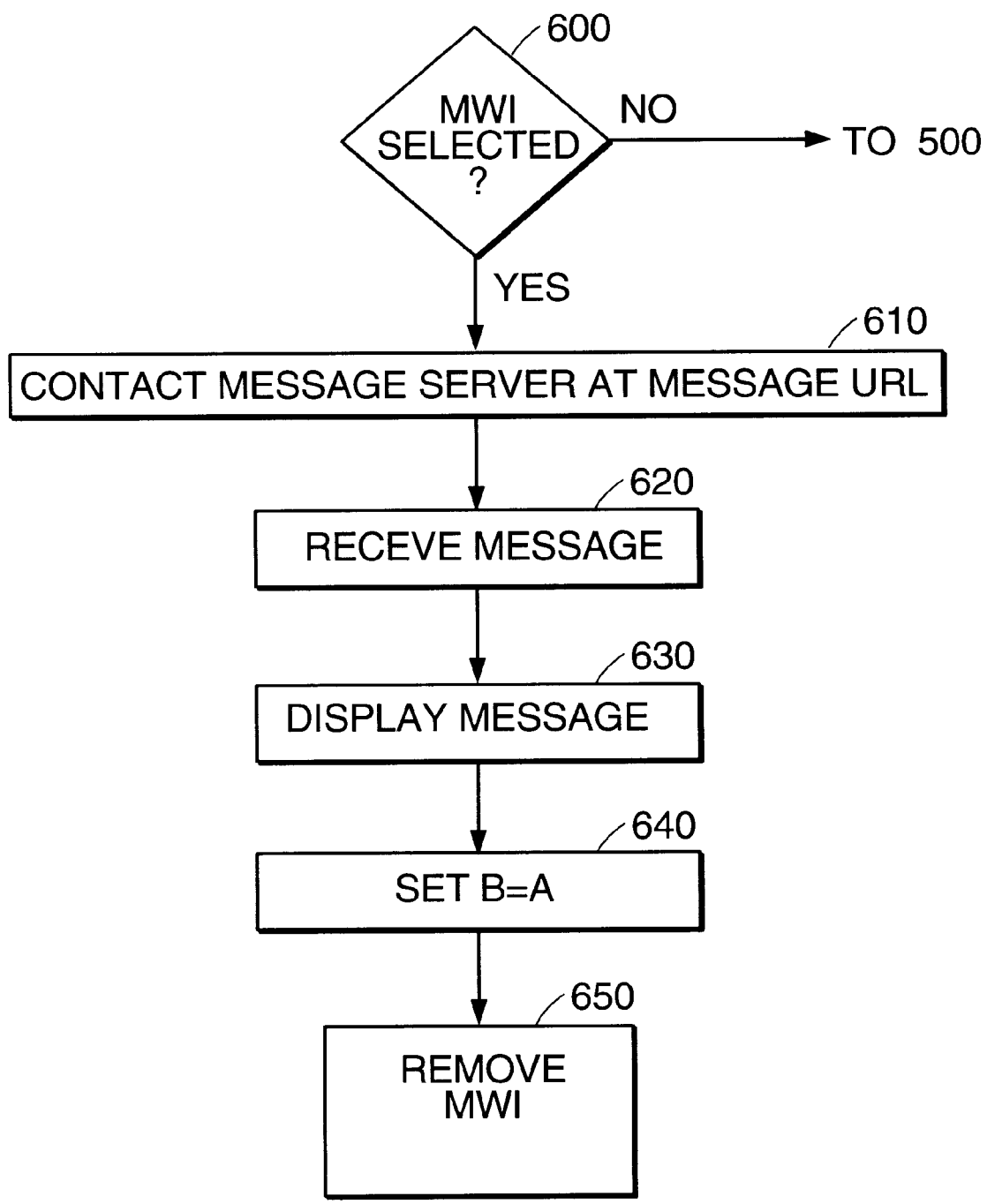
FIG. 4 is a flow diagram of depicting still other steps performed in automatic message notification in accordance with the present invention.

Referring additionally now to FIG. 4, when a user clicks on the message waiting indicator 192 the client processor 170 detects its selection in step 600. In step 610, the processor 170 contacts the message server 120 at the message server URL stored in the client memory 185. In response to contact by the client 110, the message server 120 locates a message, e.g. a web page, for the client 110. The message server 120 sends the message which is received by the client processor 170 in step 620 and displayed within web page 197 on the display 180 as the client message 194 in step 630. The client processor 170 sets the persistent state value B 240 within database 190 to the current value A 230, i.e. to equal value A', in step 640 and in step 650 removes the MWI from display 180.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A method of maintaining communications between a first processing system and a second processing system interconnected to the first processing system by a communications network, comprising the steps of:

storing a software application having a first set of instructions and a second set of instructions, the first set of instructions for causing a first application task to be performed and the second set of instructions for causing a first update signal to be transmitted from the first processing system to the second processing system;

initializing the first set of instructions to perform the first application task;

responsive to the first set of instructions being initialized to perform the first task, executing the second set of instructions thereby transmitting the first update signal from the first processing system to the second processing system;

receiving an updated first set of instructions from the second processing system responsive to the transmitting the first update signal; and updating the first set of instructions included in the software application with the received updated first set of instruction.

2. A method according to claim 1, wherein the first update signal represents an identification of a currently stored version of the second set of instructions.

3. A method according to claim 1, further comprising the step of:

transmitting, from the second processing system to the first processing system and responsive to the transmitted first update signal, a second signal indicative of information available from the second processing system.

4. A method according to claim 3, wherein the available information is one of an upgrade of the first set of instructions and information pertaining to other than the upgrade of the first set of instructions.

5. A method according to claim 3, further comprising the steps of:

inputting a command at the first processing system to request the available information from the second processing system;

transmitting, from the first processing system to the second processing system and responsive to the input command, a third signal, representing a request for the available information, in accordance with the second set of instructions; and transmitting the available information from the second processing system to the first processing system, responsive to the third signal.

6. A method according to claim 3, wherein the second signal represents a description of the available information and further comprising the step of:

displaying the description at the first processing system.

7. A method according to claim 6, wherein the description includes text.

8. A method according to claim 6, further comprising the step of:

displaying the description at the first processing system periodically.

9. A method according to claim 8, wherein the description is displayed periodically at a selected time interval.

10. A method according to claim 3, wherein the second signal represents a symbol and further comprising the step of:

displaying the symbol at the first processing system.

11. A method according to claim 3, further comprising the step of:

determining, at the second processing system, if the first processing system is within a defined group of processing systems;

wherein the second signal is transmitted from the second processing system to the first processing system only if the first processing system is determined to be within the defined group.

12. A method according to claim 3, wherein the second signal includes at least one of a description of an upgrade to the first set of instructions and an indicator of other information, and further comprising the step of:

displaying the at least one of the description of the upgrade and the indicator of other information at the first processing system.

13. A method according to claim 12, further comprising the step of:
   storing a network browser at the first processing system;
   locating a web page on the network in accordance with the network browser; and
   displaying the located web page at the first processing system;
   wherein the at least one of the description of the upgrade and the indicator of other information are displayed within a web page at the first processing system.

14. A method according to claim 12, wherein the indicator of the other information is displayed and, further comprising the step of:
   inputting a command at the first processing system to request the other information;
   wherein, responsive to the input command, the other information is transmitted from the second processing system to the first processing system and the indicator is removed from the display.

15. A method according to claim 14, further comprising the step of:
   storing a network browser at the first processing system;
   wherein the other information transmitted from the second processing system to the first processing system is loaded into the network browser.

16. A method according to claim 14, further comprising the step of:
   storing a first value and a second value at the first processing system; and
   changing one of the stored first and the stored second values responsive to the second signal to cause the indicator to be illuminated at the display.

17. A method according to claim 16, wherein the first and the second values are initially set to be equal values.

18. A method according to claim 16, wherein one of the first and the second values is changed such that the values are one of equal and unequal.

19. A method according to claim 16, further comprising the step of:
   further changing one of the first and the second values responsive to the input command to thereby cause the indicator to be removed from the display.

20. A method according to claim 19, wherein the further changed one of the first and the second values is changed such that the values are one of equal and unequal.

21. An article of manufacture for upgrading a software application having a first set of instructions and a second set of instructions, the first set of instructions for causing a first application task to be performed and the second set of instructions including a location of an upgrade for the first set of instructions, the article of manufacture comprising:
   a computer readable medium; and
   processor instructions stored on the computer readable medium, the processor instructions configured to be readable from the computer readable medium by a processor and to thereby cause the processor to operate as to:
      execute the first set of instructions;
      in response to the execution of the first set of instructions, read from the second set of instructions the location of the upgrade for the first set of instructions;
      receive from the location of the upgrade for the first set of instructions the upgrade for the first set of instructions; and
      upgrade the first set of instructions with the upgrade for the first set of instructions.

22. The article of manufacture of claim 21, wherein the location of the upgrade for the first set of instructions includes a Uniform Resource Locator.

23. The article of manufacture of claim 21, wherein the processor instructions are configured to cause the processor to operate as to:
   determine if the first set of instructions is ungradable by the upgrade for the first set of instructions.

24. The article of manufacture of claim 21, wherein the processor instructions are further configured to cause the processor to operate as to:
   generate an icon linked to the the second set of instructions of the software application; and
   responsive to a selection of the icon, read the location of the upgrade for the first set of instructions from the second set of instructions of the software application.

25. A processing system for maintaining communications between a first processing system and a second processing system interconnected to the first processing system by a communications network, comprising:
   a memory configured to store a software application having a first set of instructions and a second set of instructions, the first set of instructions for causing a first application task to be performed and a second set of instructions for causing a first update signal to be transmitted from the first processing system to the second processing system;
   a processor configured to initialize the software application to perform the first application task, to generate the first update signal from the first processing system to the second processing system in response to the initialization of the software application and in accordance with the second set of instructions to receive an updated first set of instructions from the second processing system and to update the first set of instructions from the received updated first set of instructions.

26. A system according to claim 25, wherein the first update signal further represents an identification of a current version of the stored second set of instructions.

27. A system according to claim 25, wherein the processor is further configured to process a second signal representing an indication of available information from the second processing system.

28. A system according to claim 27, wherein the available information is at least one of an upgrade of the first set of instructions and information pertaining to other than the upgrade of the first set of instructions.

29. A system according to claim 27, further comprising;
   an input device configured to accept a user command requesting the available information from the second processing system;
   wherein the processor is further configured to generate, in response to the input command and in accordance with the second set of instructions, a third signal to the second processing system, requesting the available information.

30. A system according to claim 29, wherein:
   the processor is further configured to process, in accordance with the second set of instructions, a fourth signal representing the available information from the second processing system.

31. A system according to claim 30, further comprising:
   a display configured to display the indication of available information in response to the processing of the second signal and to display at least a portion of the available information in response to the processing of the fourth signal.

32. A system according to claim 27, further comprising: a display configured to display the indication of available information.

33. A system according to claim 27, wherein:
the first update signal represents an identification of a current version of the second set of instructions; and
the indication of available information includes a description of features of an upgrade to the first set of instructions.

34. A system according to claim 33, further comprising: a display wherein the description is displayed periodically at a time interval.

35. A system according to claim 34, further comprising: an input device configured to input the time interval.

36. A system according to claim 27, wherein the indication of the availability of information from the second processing system includes at least one of a description of an upgrade to the first set of instructions and an indicator of the availability of information other than the upgrade, and further comprising:
a display configured to display the at least one of the description of an upgrade and the indicator.

37. A system according to claim 36, wherein the indicator is a symbol.

38. A system according to claim 36, wherein:
the memory is further configured to store a network browser;
the processor is further configured to locate web pages on the network in accordance with the network browser; and
the display is further configured to display a located web page with the at least one of the description of an upgrade and the indicator displayed within the displayed web page.

39. A system according to claim 36, further comprising:
an input device configured to input a command to request the available information represented by the indicator;
wherein the indicator is removed from the display in response to the input command.

40. A system according to claim 39, wherein the memory is a first memory and further comprising:
a second memory configured to store a first value and a second value, in which one of the first value and the second value is changed in response to the input command to cause the indicator to be removed from the display.

41. A system according to claim 36, further comprising:
an input device configured to input a command to request the available information represented by the indicator;
wherein the processor is further configured to generate, in response to the input command and in accordance with the second set of instructions, a third signal to the second processing system to thereby request the available information represented by the indicator and to process a fourth signal to update the first set of instructions from the available information represented by the indicator.

42. A method of establishing a communications channel between a first processing system and a second processing system interconnected to the first processing system by a communications network, comprising the steps of:
storing a software application having a first set of instructions and a second set of instructions, the first set of instructions for causing a first application task to be performed and the second set of instructions for causing a first update signal to be transmitted from the first processing system to the second processing system;
initializing the first set of instructions to perform the first application task;
responsive to the first set of instructions being initialized to perform the first task, executing the second set of instructions thereby transmitting the first update signal from the first processing system to the second processing system, the first update signal comprising first update signal information relating to the first processing system;
responsive to the first update signal, determining second update signal information to place into a second update signal;
sending the second update signal from the second processing system to the first processing system;
receiving the second update signal from the second processing, thus creating a communications channel between the first processing system and the second processing system; and
determining from the second update signal an action to execute on the first processing system.

43. The method of claim 42 wherein the first update signal information comprises at least one of:
first processing system location information, first processing system user information,
first processing system software version status information, and first processing system hardware version status information.

44. The method of claim 42 wherein at least some of the first update signal information is obtained from persistent storage on the first processing system managed by the second set of instructions.

45. The method of claim 42 wherein the second signal update information relates to a software update associated with the software application.

46. The method of claim 42 wherein the second signal information relates to a message targeted to a user of the first processing system based upon information contained in the first update signal.

47. The method of claim 46 wherein the message targeted to the user is based upon the first signal information being used to identify the first processing system as being a member of a predefined group.

48. The method of claim 46 wherein the message targeted to the user of the first processing system is verified as not having been previously displayed.

49. The method of claim 48 wherein the verification step uses a token stored on the first processing system and a token sent from the second processing, when the token stored on the first processing system and the token sent from the second processing have different values the message targeted to the user of the first processing system is verified as not having been previously displayed; and
processing of the targeted message includes storing the token sent from the second processing on the first processing system.

50. The method of claim 42 further comprising the steps of:
sending a third update signal, from the first processing system to the second processing system, the third update signal requesting an updated set of instructions for the software application;

receiving an updated set of instructions from the second processing system responsive to sending the third update signal; and updating the software application with the received updated set of instructions.

51. The method of claim 42 wherein the second update signal is sent without being directly responsive to the first signal, but responsive to a user action on the second processing system.

52. The method of claim 42 wherein the second signal is sent without being directly responsive to the first signal, but responsive to automatic processing determined by the second processing system.

53. The method of claim 42 wherein the step of storing the software application involves the use of a Web browser software program.

* * * * *